SOJI SASAKI 3,610,028

ULTRASONIC FLAW DETECTOR

Filed July 17, 1969

INVENTOR

SOJI SASAKI

BY *Craig, Antonelli, Stewart & Hill*

ATTORNEYS

United States Patent Office 3,610,028
Patented Oct. 5, 1971

3,610,028
ULTRASONIC FLAW DETECTOR
Soji Sasaki, Hitachi-shi, Japan, assignor to
Hitachi, Ltd., Tokyo, Japan
Filed July 17, 1969, Ser. No. 842,542
Claims priority, application Japan, July 19, 1968,
43/50,528
Int. Cl. G01n 29/04
U.S. Cl. 73—67.7                                    4 Claims

ABSTRACT OF THE DISCLOSURE

An ultrasonic flaw detector in which an ultrasonic beam is directed onto the surface of an object through an ultrasonic wave transmission medium at an angle of incidence satisfying the condition of total reflection and the ultrasonic wave sensing section for sensing the echo coming from the surface of the object is so sized as to meet a predetermined condition thereby to detect a flaw with high sensitivity.

BACKGROUND OF THE INVENTION

Field of the invention

This invention relates to an ultrasonic flaw detector for inspecting flaws existing on the surface of products having a very smooth surface such as steel plates, aluminum plates, stainless steel plates and other metal plates, glass sheets and rolls for rolling mills.

Description of the prior art

As is commonly known, various methods including a method of flaw detecting by visual observation, method of flaw detecting utilizing the reflection of light, method of flaw detecting by the use of surface waves at ultrasonic frequency, method of flaw detecting utilizing eddy currents and a method of flaw detecting utilizing a penetrant have hitherto been proposed and put into practice as means for detecting flaws of such objects of the kind described above.

However, the prior art flaw detecting systems utilizing the reflection of light, eddy currents, surface waves and magnetism have not exhibited a sufficient ability to detect a flaw which is very minute and has a depth smaller than several tens of microns, for example, 20 microns. While the method which resorts to visual observation has been the most precise and reliable for such extremely minute flaws, this method has inherent limitations. Further, the method utilizing the reflection of light has been defective in that a particle of oil or similar foreign material attaching to the surface of an object to be inspected may have a different reflectivity and may be mistaken for a flaw.

SUMMARY OF THE INVENTION

It is an object of the present invention to provide an ultrasonic flaw detector in which an ultrasonic beam is directed through an ultrasonic wave transmission medium onto the surface of an object to be inspected at an angle of incidence satisfying the condition of total reflection so as to solely detect an echo coming from a flaw thereby to detect the flaw with high sensitivity.

Another object of the present invention is to provide an ultrasonic flaw detector in which the ultrasonic wave sensing section for sensing an echo signal coming from the surface of an object to be inspected has a suitable size satisfying a predetermined condition so as to detect the flaw with high sensitivity.

A further object of the present invention is to provide an ultrasonic flaw detector in which the ultrasonic wave receiver has an ultrasonic wave sensing surface of a large area so as to improve the sensitivity of flaw detection.

The present invention which overcomes the defects of the prior art techniques described above and attains the above objects contemplates the provision of an ultrasonic flaw detector comprising a probe for transmitting and receiving a beam of ultrasonic pulses, high-frequency pulse generating means for repeatedly generating a pulse voltage at an ultrasonic frequency for application to said probe, echo signal amplifying means for amplifying an echo signal received by said probe, and display and/or recording means for selectively displaying and/or recording the echo signal coming from a flaw, wherein the transmitter section of said probe directs the ultrasonic beam through an ultrasonic wave transmission medium to the surface of an object to be inspected at an angle of incidence lying within the region of total reflection and said angle of incidence $\theta_1$ satisfies the condition of total reflection $1 > \sin \theta_1 > V_1/V_R$ when $V_1$ is the velocity of the projecting beam I and $V_R$ is the velocity of the beam of the surface wave.

The other objects, features and advantages of the present invention will be apparent from the following detailed description taken in conjunction with the accompanying drawing.

DESCRIPTION OF THE PREFERRED EMBODIMENTS

Figure 1:
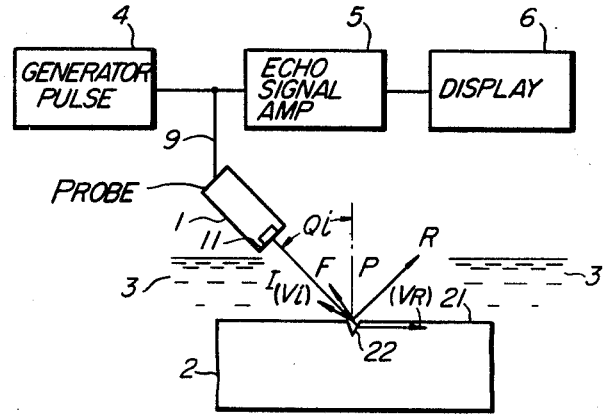
FIG. 1 is a block diagram showing the structure of an embodiment of the apparatus according to the present invention.

Referring to FIG. 1, a probe 1 which serves both as a transmitter and a receiver transmits a beam of ultrasonic pulses and receives an echo signal coming from an object 2 to be inspected. The probe 1 has a sound pressure sensing section 11 which is formed by a piezoelectric element of suitable size. The space between the probe 1 and the object 2 is filled with a suitable ultrasonic wave transmission medium 3. The ultrasonic wave propagation velocity of the ultrasonic wave transmission medium 3 must be less than that of the object 2, and it is preferable that there is a large difference between the acoustic impedances of the transmission medium 3 and the object 2. It is therefore recommended that the ultrasonic wave transmission medium 3 is a liquid such as water or machine oil when the object 2 is made of a metal material such as steel or aluminum. A high-frequency pulse generating means 4 generates repeatedly a pulse voltage at an ultrasonic frequency for application to the probe 1. An echo signal amplifying means 5 amplifies an echo signal received by the probe 1. A display or recording means 6 is operative to display or record the echo signal coming from a flaw. All the means described above may be similar to those generally employed in conventional ultrasonic flaw detectors.

According to the present invention, the ultrasonic beam I is directed from the probe 1 to the surface 21 of the object 2 at an angle of incidence $\theta_1$ lying within a range in which the ultrasonic wave undergoes total reflection. Thus, the energy of the ultrasonic wave impinging against the surface 21 of the object 2 does not penetrate into the object 2 but is totally reflected at the surface 21. If a flaw 22 exists at the point of incidence P of the ultrasonic beam I, the flaw 22 reflects or disperses the beam I to produce an echo F which is sensed by the sensng section 11 of the probe 1 to appear as an echo signal representing the flaw 22. The echo signal is amplified by the echo signal amplifying means 5 and is then displayed or recorded on the display or recording means 6 whereby the presence of the surface defect is detected.

When no flaw exists at the point of incidence P of the ultrasonic beam I, the entire energy of the projecting beam I is totally reflected in the direction of regular reflection R and no echo signal appears at the echo signal amplifying means 5, hence at the display or recording means 6. The angular region of total reflection must satisfy the condition of total reflection $1 > \sin \theta_1 > V_1/V_R$ where $V_1$ is the velocity of the projecting beam I, $\theta_1$ is the angle of incidence, and $V_R$ is the velocity of the beam of the surface wave. For instance, the angle of incidence $\theta_1$ lies preferably within a range $30° < \theta_1 < 90°$ when the object 2 subjected to inspection is of steel material having a surface wave propagation velocity of 2960 meters per second and the ultrasonic wave transmission medium 3 is water having an ultrasonic wave propagation velocity of 1480 meters per second.

Figure 2:
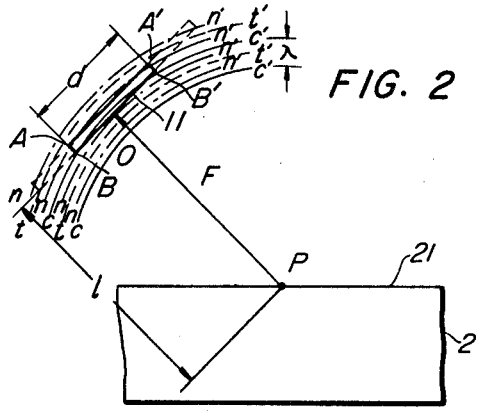
FIG. 2 is a schematic illustration of the conditions restricting the size of the ultrasonic wave sensing surface of the ultrasonic wave received in the apparatus of the present invention.

Conditions restricting the size of the sensing section 11 of the probe 1 for obtaining a high reception sensitivity will be described with reference to FIG. 2.

Suppose that a very minute flaw exists at a point P on the surface 21 of the object 2 and an echo F is propagated from the point source of sound P in the form of a spherical wave having a compression wave front C–C', a tension wave front $t$–$t'$ and a zero wave front $n$–$n'$. If the sensing section 11 has a considerably large size as shown by A–A' and extends thus across both the plane of compression wave $c$–$c'$ and the plane of tension wave $t$–$t'$, both the wave planes induce respective signal voltages of positive and negative polarities simultaneously in the piezoelectric element forming the sensing section 11 and the signal voltages so induced cancel each other to give rise to a reduction in the sensitivity of echo detection.

It is therefore one feature of the present invention that the sensing section 11 has a small size as shown by B–B' so that it extends across a wave plane interval smaller than ½λ where λ is the wavelength. Suppose, for example, that the sensing section 11 is in the form of a disc having a diameter $d$ and the distance between the center O thereof and the position P of the flaw is $l$. Then, it is necessary that the diameter $d$ of the sensing section 11 be so restricted as to satisfy the condition $d < \sqrt{\lambda^2 + 4\lambda l}$. It is desirable to determine the size of the sensing section 11 such that it extends across a wave plane interval smaller than and excluding ½λ. Theoretically, it is most preferable for the sake of precision to determine the size of the sensing section 11 such that it extends across a wave plane interval corresponding to ¼λ. In FIG. 2, the sensing section 11 is shown as having a size which extends across a wave plane interval of ¼λ.

One practical example of the probe 1 in the present invention will next be described.

It is commonly acknowledged that one of the methods for improving the efficiency of an ultrasonic flaw detector is to enlarge the ultrasonic wave projecting area of the ultrasonic wave transmitter as well as the ultrasonic wave sensing area of the ultrasonic wave receiver. In the case of the transmitter in order to enlarge the projecting area without enlarging the sensitivity of ultrasonic wave projection, a transmitting piezoelectric element of large area may be employed and the input impulses energy applied thereto may be increased as required. However, in the case of the receiver, mere enlargement of the area of a receiving piezoelectric element so as to increase the sensing area results in a reduction of the sensitivity of flaw detection for the following reasons: That is, with the increase in the area of the sensing section, more displacement will occur in the phase of the incoming ultrasonic echoes, depending on their position of arrival at the sensing surface, and signal voltages induced at different positions may cancel each other out, thereby giving rise to a reduction in the sensitivity of ultrasonic wave reception.

Further, it is not an expedient way to employ a piezoelectric element having a large ultrasonic wave sensing area, in such cases where an area of influence on the surface of the object is limited within a certain range, due to the fact that an output signal level is low since the intensity of the output signal produced at the piezoelectric element is in proportion to the area of incidence of the transmitted ultrasonic wave and in inverse proportion to the sensing area of the piezoelectric element.

Figure 3:
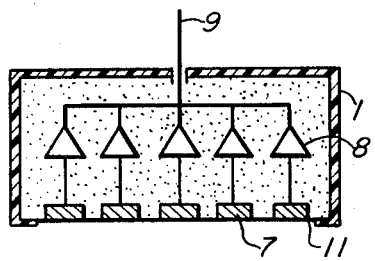
FIG. 3 is a sectional view of one form of the ultrasonic wave receiver provided with a plurality of piezoelectric elements and amplifier elements.

One form of the receiver preferred in the present invention will be described with reference to FIG. 3. In the receiver, the sensing section 11 comprises a plurality of small piezo electric elements 7 arranged in side-by-side relation, and a plurality of amplifying elements 8 are connected to the respective piezoelectric elements 7 so that individual signals induced in the respective piezoelectric elements 7 due to arrival of the ultrasonic wave can be amplified by the respective amplifying elements 8 and the amplified signals are transmitted by way of a cable 9.

In this connection, amplification of outputs from the piezoelectric elements 7 by means of a single amplifying element is undesirable in that the outputs from the piezoelectric elements 7 cancel each other. It is important that the outputs from the respective piezoelectric elements 7 are amplified by the associated amplifying elements 8 and the amplified outputs are transmitted en masse.

From the foregoing description it will be understood that, in the present invention, an ultrasonic beam is directed from a probe 1 to the surface 21 of an object 2 under conditions of total reflection, so as to prevent any ultrasonic energy from penetrating into the interior of the object 2. Thus, the echo signal received by the probe 1 is independent of the internal state of the object 2 and the signal representing the flaw 22 is solely displayed or recorded on a display or recording means 6 so that the flaw can be very easily detected.

Further, due to the fact that an ultrasonic wave transmission medium 3 is solely disposed in the path of the ultrasonic wave between the probe 1 and the flaw 22 to be detected, and any other acoustic boundaries which might give rise to transmission losses of the ultrasonic wave do not exist, the efficiency of the transmission and reception of the ultrasonic wave to and from the flaw 22 is quite high and the sensitivity of detection becomes correspondingly high.

Moreover, the fact that the size of the ultrasonic wave sensing section 11 of the probe 1 is limited to meet a predetermined condition eliminates the objectionable phenonenon that both the plane of the compression wave and the plane of the tension wave of the received echo signal are simultaneously sensed and signal voltages of positive and negative polarities induced in the probe 1 cancel each other.

I claim:

1. An ultrasonic flaw detector comprising transmitter means for directing a beam of ultrasonic pulses to an object to be inspected, receiver means for receiving an echo signal produced at the surface of the object, high-frequency pulse generating means for repeatedly generating a pulse voltage at an ultrasonic frequency for application of same to said transmitter means, echo signal amplifying means for amplifying the echo signal received by said receiver means, and display and/or recording means for selectively displaying and/or recording thereon the echo signal representing a flaw, wherein said transmitter means directs the ultrasonic beam to the surface of the object through an ultrasonic wave transmission medium at an angle of incidence lying within the region of total reflection so as to satisfy the condition of total reflection $1 > \sin \theta_1 > V_1/V_R$ where $V_1$ is the velocity of the projecting beam I, $\theta_1$ is the angle of incidence and $V_R$ is the velocity of the beam of the surface wave, and wherein said receiver is positioned to receive an echo signal from a surface flaw at the point of incidence of the transmitted wave.

2. An ultrasonic flaw detector comprising transmitter means for directing a beam of ultrasonic pulses to an object to be inspected, receiver means for receiving an echo signal produced at the surface of the object, high-frequency pulse generating means for repeatedly generating a pulse voltage at an ultrasonic frequency for application of same to said transmitter means, echo signal amplifying means for amplifying the echo signal received by said receiver means, and display and/or recording means for selectively displaying and/or recording thereon the echo signal representing a flaw, wherein said transmitter means directs the ultrasonic beam to the surface of the object through an ultrasonic wave transmission medium at an angle of incidence lying within the region of total reflection so as to satisfy the condition of total reflection $1 > \sin \theta_1 > V_1/V_R$ where $V_1$ is the velocity of projecting beam I, $\theta_1$ is the angle of incidence and $V_R$ is the velocity of the beam of the surface wave, and wherein said receiver is positioned to receive an echo signal from a surface flaw at the point of incidence of the transmitted wave, and said receiver means is so sized that it does not exceed the wave plane interval corresponding to ½ of the wavelength of the echo signal produced by the flaw existing on the surface of the object.

3. An ultrasonic flaw detector as claimed in claim 2, in which the means for receiving the echo signal produced at the surface of the object comprises a plurality of small piezoelectric elements which are arranged in side-by-side relation and are connected to respective amplifying elements whose output terminals are connected to a common lead.

4. An ultrasonic flaw detector comprising transmitter means for directing a beam of ultrasonic pulses to an object to be inspected, receiver means for receiving an echo signal produced at the surface of the object, high-frequency pulse generating means for repeatedly generating a pulse voltage at an ultrasonic frequency for application of same to said transmitter means, echo signal amplifying means for amplifying the echo signal received by said receiver means, and display and/or recording means for selectively displaying and/or recording thereon the echo signal representing a flaw, wherein said transmitter means directs the ultrasonic beam to the surface of the object through an ultrasonic wave transmission medium at an angle of incidence lying within the region of total reflection so as to satisfy the condition of total reflections $1 > \sin \theta_1 > V_1/V_R$ where $V_1$ is the velocity of the projecting beam I, $\theta_1$ is the angle of incidence and $V_R$ is the velocity of the beam of the surface wave, and said receiver means is provided with an ultransonic wave sensing section consituted by a plurality of small piezoelectric elements which are arranged in side-by-side relation and are connected to respective amplifying elements whose output terminals are connected to a common lead, and wherein said receiver is positioned to receive an echo signal from a surface flaw at the point of incidence of the transmitted wave.

References Cited

UNITED STATES PATENTS

| | | | |
|---|---|---|---|
| 2,645,933 | 7/1953 | Arenberg | 73—67.8 |
| 3,364,732 | 1/1968 | Sasaki | 73—67.8 |

FOREIGN PATENTS

| | | | |
|---|---|---|---|
| 714,564 | 9/1954 | Great Britain | 73—67.8 |

CHARLES A. RUEHL, Primary Examiner

J. P. BEAUCHAMP, Assistant Examiner

U.S. Cl. X.R.

73—67.8